Sept. 2, 1969  F. R. SCHLEIF  3,464,432
APPARATUS FOR STABILIZING SPEED CONTROL ACTION
ON HYDRAULIC TURBINES
Filed May 8, 1967  3 Sheets-Sheet 1

INVENTOR
FERBER R. SCHLEIF
BY
ATTORNEYS

Sept. 2, 1969            F. R. SCHLEIF            3,464,432
APPARATUS FOR STABILIZING SPEED CONTROL ACTION
ON HYDRAULIC TURBINES
Filed May 8, 1967            3 Sheets-Sheet 2

INVENTOR
FERBER R. SCHLEIF
BY
ATTORNEYS

United States Patent Office 3,464,432
Patented Sept. 2, 1969

3,464,432
APPARATUS FOR STABILIZING SPEED CONTROL ACTION ON HYDRAULIC TURBINES
Ferber R. Schleif, Denver, Colo., assignor to the United States of America as represented by the Secretary of the Interior
Filed May 8, 1967, Ser. No. 637,884
Int. Cl. F01b 25/00; G05d 13/00
U.S. Cl. 137—26                                            7 Claims

ABSTRACT OF THE DISCLOSURE

A speed governing procedure and apparatus characterized by an arrangement for a hydroelectric turbine having speed stabilization circuitry including first and second differentiators receiving as their respective inputs signals representing turbine generator frequency and acceleration produced from a turbine speed-sensing transducer and as an output from the first differentiator, respectively. A rate of change of acceleration signal derived from the second differentiator is supplied to a summation amplifier together with the first differentiator output signals, and other signals including those representing speed deviation from a reference speed and turbine load distribution. Signal output from the summation amplifier controls an electromechanical trandsucer providing a drive to a pilot-relay valve mechanism determining the position of a turbine speed control gate structure in the penstock conduit leading to the turbine runner.

---

Figure 1:
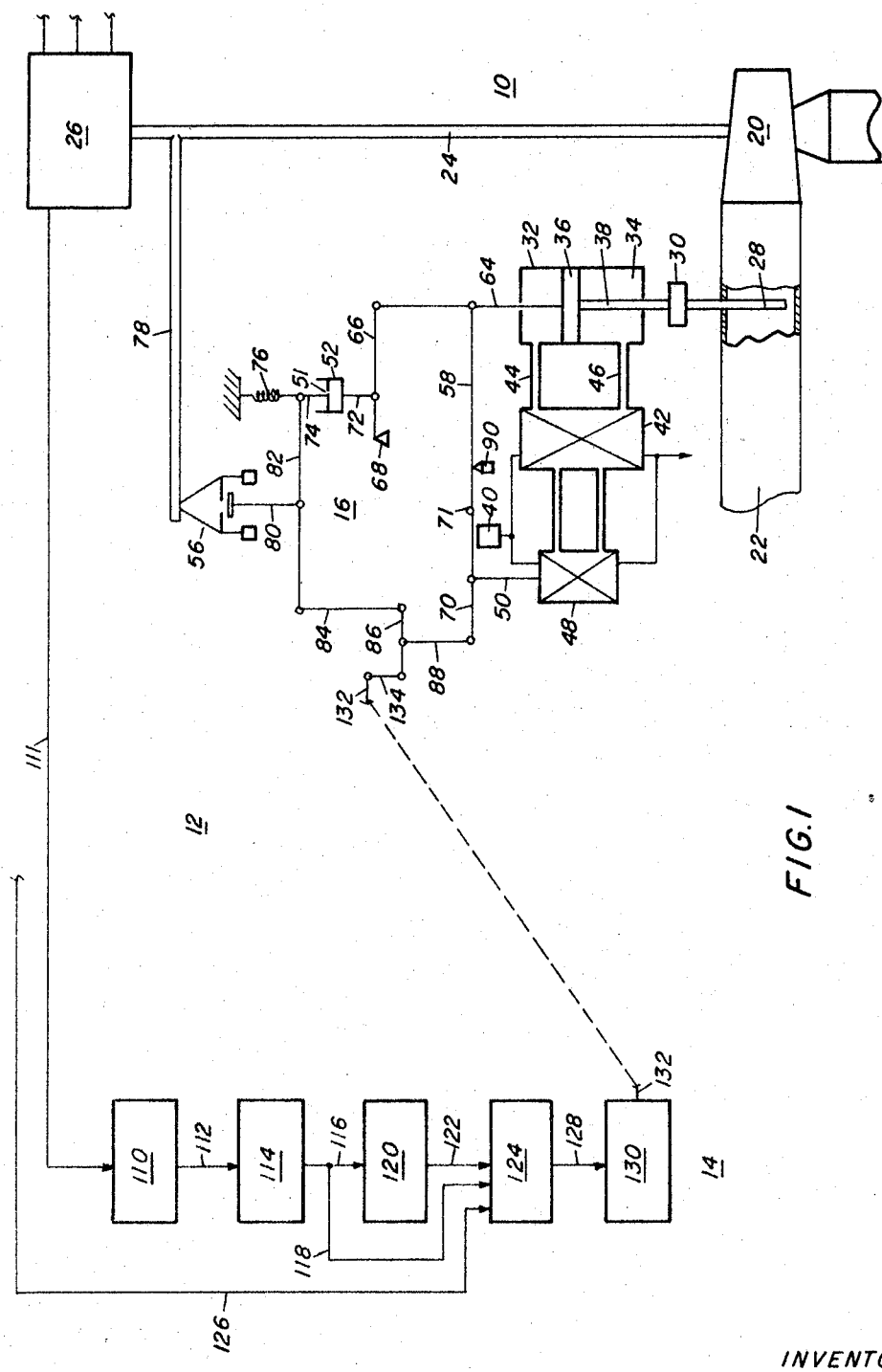

This inventiotn relates to a method and apparatus for stabilizing the speed control of heavy rotating machinery, and in particular governor control in the operation of hydroelectric power generating units.

Stabilization of governor function is of special importance to achieving stable speed control in hydraulic turbine operation since speed response to changes in gate positioning at the penstock opening to the turbine is delayed by influences such as that arising from the inertia of that water column in the penstock. Once the gate is set in motion by a change in speed an effective stabilization must anticipate the proper gate position required and stop the gate at such position until the speed correction catches up. Commonly used techniques wherein governor dashpots are by-passed to achieve fast response to tieline control signals sacrifices stability of speed regulation. The action of another type of governor which is normally responsive to only the first derivative of speed, obtains quite limited improvements in stabilization or to speed of response to the tieline control. A more effective stabilization is accomplished in the present invention by employing a control response to the second derivative of the turbine rotational speed in addition to a control based on the first derivative of this speed. Improved stabilization occurs mainly because the phase advance or anticipatory characteristic attributable to the first derivative, or acceleration, amounts to $\pi/2$ radians whereas that arising from the second derivative or rate-of-change of acceleration provide a phase advance of $\pi$ radians.

Heretofore only the effect of the first derivative characteristic was applied to check or promote gate opening in proportion to positive or negative acceleration, respectively. When in accordance with the teaching of the present invention gate control function is augmented by the effect of the second derivative characteristic the required gate position is anticipated earlier. Consequently, with proper proportions of the first and second derivatives made available for control, higher gate speed than was previously possible can be used in a given installation, and the required gate excursion is completed earlier to stop at the proper position to achieve stability. The faster excursion to a more appropriate control position of the gates thus achieved by the invention results in an improved speed control wherein there is less deviation for a given change in load.

A double derivative stabilized governor control functions advantageously also when a change of load and gate position is required by signals other than that due to a change of speed. Since the higher rate of gate movement made usable by the double derivative for stabilizing responses to speed changes permits more rapid response, among such other signals would include the manual control for reproportioning generation among generating units or the automatic reproportioning of generation by tieline control.

Any time lag in the responsiveness of the valve, servo and gate system of a hydraulic turbine governor tends to limit the effectiveness of any derivative stabilization. Therefore, feedback system from the gate to pilot valve which minimize such delay, normally constitute a proper part of the governing system. Since the aforesaid delay is ordinarily not eliminated, but only minimized, compensation therefor by a response incorporating the second derivative acts significantly in a cooperation gaining highly effective stabilized operation of hydraulic turbines. A separate velocity feedback system may be incorporated to improve proportionality between pilot valve displacement and servomotor velocity. Alternatively the dashpot temporary droop system which has been replaced in function by the double derivative stabilization, may be readjusted to serve the velocity feedback function.

Accordingly, it is an object of the present invention to provide an improved speed governing system by virtue of double derivative stabilization made effective therein.

It is a further object of the invention to provide a highly responsive speed governing sysem which additionally responds more rapidly to supplementary control without sacrificing stability of speed governing.

Figure 2:
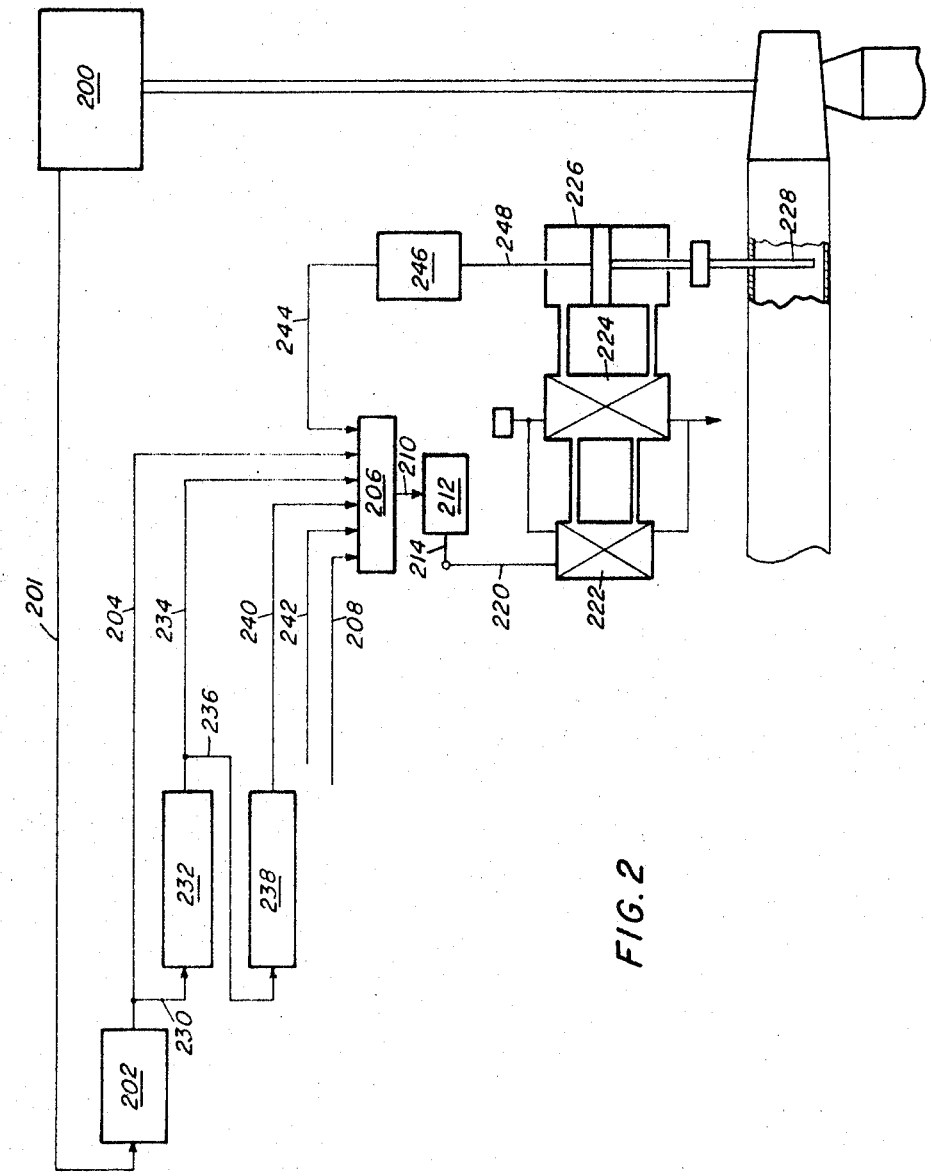
Figure 3:
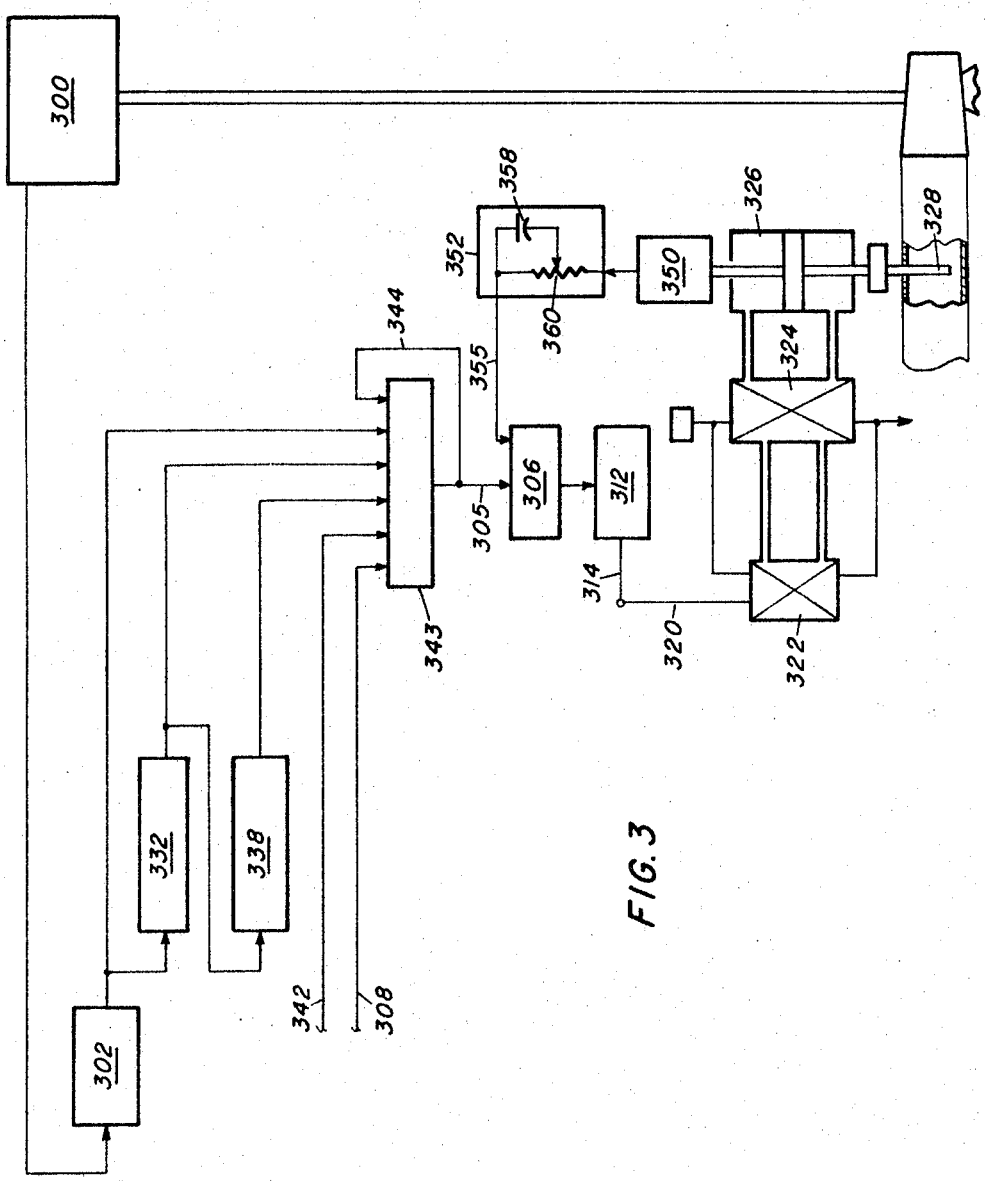

The manner in which these and other objects of the invention are attained will become clear from the detailed description which follows and the drawings in which FIG. 1 schematically illustrates an adaptation of a preferred embodiment of the speed control stabilzing system according to the invention; and FIGS. 2 and 3 are further schematic showing which illustrates additional adaptations of the invention constituting second and third embodiments of a system as shown in FIG. 1.

Represened in FIG. 1 is a hydraulic turbine-electric generator arrangement 10 wherein a speed governing and stabilization system 12 includes operation stabilization structure 14 set up separately from primary speed control apparatus 16 of the system. In this manner a speed control apparatus having conventional governor mechanisms originally designed to be stabilized by operation of dashpot and temporary droop device can be readily adapted to function in a special cooperative relationship of the combination including such apparatus and stabilization structure 14. Hydroelectrical arrangement 10 includes a hydraulic turbine 20 whose runner wheel is driven by the force of a flow directed from a penstock 22, and whose shaft 24 is connected to drive an electric generator 26 in a manner well known to the art.

The effective flow into the turbine casing is controlled by a distributor assembly operatively arranged therein which includes a gate structure generally formed by a ring of guide vanes situated between the penstock outlet and the turbine runner. Regulation of turbine operation in the FIG. 1 embodiment is accomplished by system 12 exercising control over the position of a gate structure 28. A gate or vane shifting mechanism 30 provides a positive connection between gate structure 28 and a servomotor device 32 of system 12. A cylindrical casing 34 of the servomotor encloses a piston member 36 for reciprocative displacement therein whereby a rod 38 affixed to one face of the piston is operable through its connection in shifting mechanism 30 to position turbine gate structure 28. Piston displacement is obtained by application of a differential pressure thereon produced by oil supplied to cylinder 34 from a pressure tank oil reservoir 40, by way of a main or relay valve 42 and tubular conduits 44 and 46. Relay valve 42 determines the displacement of piston 36 in response to a positional control of the relay valve by a pilot valve 48. A plunger 50, axially displacable in pilot valve 48, in a manner to be hereinafter more fully explained, is effective to selectively channel oil flow about a control collar on the stem of a further plunger so as to control relay valve 42 to assume a displacement proportional to that of pilot valve plunger 50.

Forces directing the displacements of valve control plunger 50 are derived in control apparatus 16 which includes an arrangement of linkages and levers cooperating with a dashpot device 52 and a ball head speed sensor 56. A temporary droop system of this apparatus, operating to correct for drops in rated speed ranging from 25 to 80 percent due to generator loadings, includes a plunger control floating lever 70 which acts by way of further levers 66 and 82, links 64, 72, 84, 86 and 88, and through dashpot device 52, to operatively associate servomotor device 32 and its controlling valves with speed sensor 56, so that the valves respond to a speed correcting drive in the system initiated by the sensor's speeder rod 80. Also made operable in this arrangement is a permanent droop system including a lever 58 which pivots on a fulcrum 90, and turns about a pin connection with respect to the end of link 64 projecting from servomotor device 32 wherein link 64 is connected to piston member 36 for displacement therewith. Operation of lever 58 on fulcrum 90 displaces a pin connection 71 of floating lever 70. With the pin 71 end of lever 70 thus displaced in proportion to gate position, and the opposite end thereof displaced in proportion to speed by levers and linkage 80, 82, 84, 86 and 88, a permanent droop relation between speed and gate opening is established.

A drooping speed-load relationship defining a permanent droop obtaining a drooping speed characteristic with increasing load which could range up to 5 percent of rated speed at full load, becomes necessary to produce a determinate division of load between parallel turbine generator units. In paralleling such machines the load setting is shifted such that if two machines, each operating at 5 percent droop from no load to full load, are connected together and loaded with such load as to represent one-half their aggregative capacity, the speed would droop by two and one-half percent below initial value and each of the units would assume one-half of the load. Balance between the units could be achieved with no other adjustments for proportioning. Although systems do not allow a droop in speed except temporarily, nevertheless division of load among the machines is established by the droop relation even though the speed is corrected back to normal by raising the pivot points at points at fulcrums 90 of droop levers 58 of the participating machines. On the other hand, the ratios of levers 66, 82, 70 and 58 all influence the temporary droop. This is ordinarily adjusted by changing the throw of the dashpot at link 72 which in effect changes the position of a pivot point 68 of lever 66. A common value of temporary droop, such as 50 percent, would be that droop which if dashpot reset were absent would cause the speed to be regulated to one-half the normal value when gate opening is increased by full stroke. In normal operation this influence is allowed to subside exponentially at a rate controlled by dashpot reset which is generally regulated by a needle valve control in an aperture 51 of a piston affixed to dashpot plunger 74. However, the recovery time of 2 seconds and longer of a conventional speed regulating system, heretofore described, can be made up to four times faster when the present invention is operatively associated therewith.

In the operation of the FIG. 1 arrangement, pilot valve plunger 50 is flexibly connected to move with link 70, which is in turn coupled to the other end of lever 58 to constitute a turning pair at the pin connection 71. The casing of dashpot 52, which is flexibly connected by rod-like link 72 to pivot with respect to lever 66, encloses a dashpot plunger 74. A spring 76, connected to the base structure, acts in tension or compression to constrain plunger 74 depending on whether the system is responding to correct an increasing or decreasing speed condition. Governor ball head 56 is driven either directly by a power take-off 78 from turbine shaft 24, or by a pilot generator whose output is responsive to the rotation of shaft 24. Speeder rod 80 projecting from governor 56 is thus axially displaceable upwardly and downwardly in response to changes decreasing and increasing turbine drive frequency, respectively, pursuant to conventional governor operation. Governor rod 80 is operatively associated with dashpot plunger 74, and the servomotor valve actuators by a pin connection at an intermediate point on a floating lever 82 whose opposite ends are respectively pin connected to turn in coordination with dashpot plunger 74, and pilot valve plunger 50 by way of a flexible linkage train including the levers and links 84, 86, 88, and 70.

Basic regulatory control of turbine operation is achieved by displacements of gate 28 following the activity of servomotor 32 in response to the governor control imposed thereon in association with the stabilizing action produced by dashpot 52 in the temporary droop system. As is well known in the art, the governor regulates turbine speed within a predetermined range by increasing or decreasing the flow admitted to the turbine wheel so as to maintain a balance between power input and power demand. Since the rotational frequency of the turbine shaft varies initially with power demanded from the generator, the governor responds to a drive thereto from shaft 78 to effectuate further gate opening or closing as the power demanded increases or decreases, respectively.

Upon an increasing demand for power during operation a slight decrease in shaft speed occurs which allows a partial collapse of the governor flyballs and a measurable drop of governor control rod 80 therewith. The left end of lever 82, as viewed in FIG. 1, is thus lowered by speeder rod 80 since the right end of the lever is then held relatively stationary by dashpot 52, and linkage 72, 66 and 64 leading to servomotor piston 36 whose position is in turn maintained fixed by oil pressure forces thereon. As a result, linkage train 84, 86, 88, and 70 is directed down and shifts plunger 50 within pilot valve 48 to commence a directional flow of oil under pressure which acts to operate relay valve 42. Oil under pressure directed by the relay valve to flow into servomotor casing 34 by way of conduit 46, is thereby made effective to lift piston 36 and resituate gate 28 therewith in a direction allowing greater flow to the turbine runner. The attendant movement of servomotor piston 36 in response to governor control acts to initiate a valve restoring cooperation wherein levers 66 and 82 receive reverse pivotal displacements limited in duration by dashpot 52. Upward displacement of lever 82 during restoration by the drive transmitted thereto from piston 36, is not sustained but subsides as spring 76 resets the dashpot piston to initial position. As was previously explained, the rate of restoration is adjustable at aperture 51 of the dashpot piston which regulates flow of the dashpot fluid to the opposite side of the piston therein. Consequently, linkage chain 84, 86, 88 and 70 is drawn upwards at a corresponding rate to shift plunger 50 of the pilot valve back to neutral position. Relay valve 42 responds by restoring its channeling control slide to a position wherein it no longer allows oil to further displace piston 36. Floating lever 82 is concurrently restored to a centered position by governor action responding to a return of the turbine to rated frequency. Overspeeding, due for example to a critical drop in power demand, is similarly corrected by cooperations in reverse directions among the appertaining parts including the valves, linkage and dashpot.

In view of the high response rate attainable by double derivative governing according to the present invention, an operative association thereof with a tieline control function becomes particularly advantageous. Tieline control is a conventional form of power system operation which functions to effect the division of power generation among interconnected systems, and manifests itself in effecting power flow across the interconnecting tielines. Since tieline control does not influence either total load or total power generation, but only the proportions of the total load which are carried by various generators, plants or systems, the tieline control function is only indirectly related to the governing function and not a function of system speed. Thus, the stabilizing parameters of the governor will permit a certain rate of gate response to the external tieline signal in the absence of speed deviation. The tieline control setting can be introduced mechanically to the governing control system shown in FIG. 1, by the previously described adjustments made to fulcrum 90 which effects the disposition of lever 58 by contacting it at a predetermined intermediate point thereon. Since pilot valve 48 is thus displaced thereby tieline control produces gate movement even though there is no speed deviation present at the time. The rate of gate response is also influenced by the lever ratios and valve openings characterizing the governing arrangement.

The more effective stabilization control of the present invention is substituted for the temporary droop system control heretofore disclosed. For this purpose the speed or frequency of the turbine-generator arrangement 10 is sensed through connections at the main generator 26, or indirectly by an auxiliary or pilot generator driven by the generator shaft. A frequency transducer 10, made operative by an input thereto received on connector 111 from the speed sensor equipment, produces a signal output on electrical connection 12. The transducer output, expediently supplied as a direct current signal, is received in a differentiator 114. A first derivative of the frequency, $df/dt$, or the angular acceleration of the turbine drive, is produced in differentiator 114, and supplied as acceleration representing output signals on electrical connections 116 and 118.

The first differentiation signals $df/dt$ are carried on connection 116 to a further differentiator 120 in which a second derivative of the frequency, $d^2f/dt^2$, or the rate of change of acceleration, is produced as indicative output signals on electrical connection 122. A driver amplifier 124, in a circuit with differentiator electrical lead connections 118 and 122, receives as inputs on these leads appropriate amounts of the first and second derivatives signals. Such relative amounts of the derivatives signals are empirically determined as functions of water column inertia, flywheel effect and other secondary influences such as servosystem gain and delay, which are most advantageously derived by computations with the results of direct field tests. Moreover, an increase in the relative amount of the second derivative factor is indicated for improving the sluggish operation of very large units since a relatively larger proportion of second derivative input acts to decrease the time lag in the servosystem response operating to directly displace the penstock gate closest to a speed correcting position. Units which because of their size would otherwise have a recovery time as high as 1.5 to 2 seconds, can be caused to operate with a time lag of only .1 to .2 of a second by applying as high as 80 percent second derivative input. Suitable controls for conveniently establishing the requisite ratio of output to input at the differentiators to provide appropriate magnitudes of first and second derivatives on electrical lead connections 118 and 122, include potentiometers which control the gain therein. In addition, amplifier 124 is fed signals through an electrical connection 126, representing a tieline control factor, the effect of which on the electrical arrangement herein corresponds to that previously explained for the tieline control action at fulcrum 90 in the mechanical arrangement.

The summation of the signals received in amplifier 124 by way of connections 118, 122, and 126, is suitably amplified and supplied on electrical connection 128 as a driver current to a motion transducer 130. The degree and direction of mechanical displacements given a driver arm 132 of transducer 130 corresponds to an appropriate stabilizing function for the speed control apparatus 16. Consequently, the orientation of link bar 86 is determined by the transducer drive thereto through link 134, as well as the drive originated by governor speed sensor 56 transmitted thereto through linking elements 80, 82, and 84. A summation of these drives thereby adjusts the effective position of the kinematic chain including links 86, 88 and 70, and shifts pilot valve plunger 50 accordingly whereby servomotor control over the displacement of gate 28 reflects the speed control by speed sensor 56, and the added stabilization effect thereon obtained through stabilizing system 14. Since the stabilizing function of the speed control operation is taken over by the derivatives, the stabilization normally accomplished by the dashpot is no longer required. Therefore, the dashpot is bypassed to permit the higher speed response with the derivative stabilization. The dashpot is usually bypassed by opening the aperture in its piston which allows fluid to flow from below the piston to a space above it, whereby the time required for a complete recovery of the dashpot after a displacement, is significantly shortened.

In the embodiment of FIG. 2, generator shaft speed or frequency can also be sensed from either a main generator 200, or an auxiliary generator driven by the main generator shaft and providing a corresponding output on lead 201. A transducer device 202, which can be either energized or driven by one of the aforesaid frequency sensor means, produces a direct current output which becomes available on electrical lead 204 as shaft frequency or velocity signals. The frequency signal supplied on electrical lead 204 is directly connected to a driver amplifier 206 wherein this signal, representing the instant shaft speed, is balanced against a base or reference speed signal transmitted to the amplifier on electrical lead 208. The difference represents speed deviation from a standard, and produces an amplifier output on a lead 210 connected to an electromagnetic motion transducer 212. Output from transducer 212 is manifested as a drive on an arm 214. This drive is transmitted through a turning pair connection on arm 214 acting to shift a port opening-closing control plunger 220 in a pilot valve 222. Oil under pressure is thus directed to control a relay valve 224 which is thereby made to assume a displacement proportional to that of pilot valve plunger 220. This representation of speed deviation driving pilot valve plunger 220 to determine the operation of relay valve 224, accordingly functions to control a servomotor 226 for effectuating the corrective movements of turbine gate 228 in a manner which was previously explained.

To effectuate the desired speed control stabilization in the FIG. 2 arrangement, the frequency signal produced in transducer 202 is also fed on an electrical lead 230 to a first differentiator 232. Signals produced by differentiator 232 to represent the first derivative of speed, are supplied on separate electrical leads 234 and 236 to provide inputs to amplifier 206, and a second differentiator 238, respectively. Output signals from differentiator 238, which are representative of the rate of change of acceleration, are supplied on electrical lead 240 for input to amplifier 206. These acceleration and rate-of-change of acceleration signals are fed to driver amplifier 206 in proper proportions and amount, and are summed together with other inputs to the amplifier on further leads 242 and 244, respectively, transmitting signals representing change of power for tieline control purposes, and signals proportional to the output of the unit being governed to produce a drooping speed-load characteristic which would facilitate division of load among paralleled units. The permanent speed droop signal on lead 244 is produced in a transducer 246, which develops an appropriate input therefor by sensing the position of the penstock gate. The electrical signals ensuingly generated by the summation function of amplifier 206 combine with any speed deviation correction signals concurrently derived in the amplifier to produce stabilized correction signals on lead 210. Transducer 212 operates in response to these amplifier signals and effects the displacements of valve control drive arm 214 accordingly.

An important feature of the further form of the present invention shown in FIG. 3, is the use therein of phase correction for producing a gate position feedback signal. In this arrangement of the invention a summer-integrator unit 343 is utilized to receive the plurality of control signals, including a permanent droop signal on lead 344, and integrate them to produce a gate position command signal on a lead 305, rather than a gate correction signal of the type delivered at the corresponding point in the embodiments of FIGS. 1 and 2. A conventional ratioing potentiometer is operable in lead 344 to adjust the value of the input supplied therefrom to unit 343 at about 5 percent of the output supplied from the unit to the lead, which facilitates satisfaction of the usual permanent droop requirements heretofore explained. A signal corresponding to actual gate position supplied on a lead 355, is compared with the output signal on lead 305 and caused to match the command signal thereof as closely as practicable by means of a feedback loop arrangement consisting of a driver amplifier 306, an electromagnetic transducer 312, valves 322 and 324 in cooperation with a servomotor 326, a gate position signal transducer 350 and a phase corrector 352 supplying a feedback stabilizing input to the loop. Driver amplifier 306 is responsive to the difference between the two inputs thereto on leads 305 and 355, representing the gate command signal and the gate position feedback signal, respectively. Any measurable difference in these signals operates to displace the pilot valve and cause the servosystem to move a penstock gate 328 in such direction as to eliminate the difference. In all other respects there is a structural and functional correspondence between the several embodiments of the invention, as is evident from FIG. 3 where the arrangement includes a generator 300, frequency transducer 302, differentiators 332 and 338, and tieline and reference inputs on leads 342 and 308 to summer-integrator 343.

Unless phase correction of the gate position feedback signal is employed the gain in the loop must be quite limited in order to maintain stability of the loop. However, when the phase of the feedback is properly corrected to compensate for the valve and servomotor lags, the gain in the loop, such as in the driver amplifier, may be made quite large. The higher gain allowable by virtue of the phase correction is particularly advantageous as it offsets the nonlinearities of the valve system and delays of the servo system, resulting in more rapid and accurate response. One convenient form of the phase corrector network consisting of a capacitor 358 and variable resistor 360, having an adjustable tap, as shown, is suitable to operate on a D-C electrical signal. A current derived in transducer 350 to vary with the changing gate position, which is initially relatively high, passes through the low impedance of the phase corrector resistance and capacitance elements 356 and 358, and gives rise to leading transient current in the output on lead 355. Thus the gate position signal current received in amplifier 306 comprises steady state current representing instant gate position and a component current representing an anticipation of the position the gate is destined to assume when corrected. This augmentation of the control signal supplied on lead 355 to amplifier 306, is transiently effective in the comparison with the command signal received in the amplifier on lead 305, to suitably moderate the amplifier output whereby the actual displacement control by the servomotor elements 322, 324, and 326 is determined to be substantially that which is required to directly achieve the corrected position of the gate. As a result of this aperiodic response in the feedback arrangement, the operation establishing equilibrium therein is characterized by a damping effect which overcomes the hunting ordinarily associated with the lags of the valves and servomotor parts. However, the principle of this aspect of the invention applies to an adaptation of other equivalent mechanical or hydraulic means for achieving the phase correction.

Transducers, differentiators, and driver amplifiers of conventional construction and operation could serve satisfactorily in achieving the functions of the invention. However, it is important that the transducer produce a mechanical movement directly proportional to the electrical signal supplied thereto, with little or no inherent friction, backlash, or hysteresis, any of which would degrade its linearity. Conventional driver amplifiers are suitable since they need only achieve power or signal level match between the output of the frequency transducers and differentiators to provide sufficient power to drive the output transducer.

What is claimed is:

1. An apparatus to stabilize speed regulation of fluid driven rotating machinery comprising means for sensing speed of said rotation and producing an output representative of said speed, a transducer means connected to receive said output and responsive thereto to produce a speed signal, a first differentiator connected to receive as an input said speed signal and responsive thereto to produce as an output an acceleration signal, a second differentiator connected to receive as an input said acceleration signal and responsive thereto to produce as an output a rate-of-change of acceleration signal, a signal summation device connected to receive as inputs both of said differentiator output signals and a further load control influencing signal from a source thereof, and responsive thereto to produce as an output a driver signal having magnitude and direction determined in accordance with the magnitude and direction of the resultant summation of said inputs to said device, means connected to receive said driver signal for producing in response thereto a drive output having magnitude and direction corresponding to said driver signal, governor means connected to said machinery and responsive to speed variations thereof to produce a further drive output, means to determine the effective force of the fluid drive rotating said machinery, and means operatively responsive to a combination of said drive and further drive outputs to control the magnitude and direction of the effect of said fluid drive force determining means.

2. The apparatus of claim 1 wherein said speed signal transducer produces a direct current output, said first and second differentiators comprise electrical means, said signal summation device comprises an electrical amplifier responsive to electrical signals from said differentiators and said further signal source to produce an electrical driver signal, and said means responsive to said driver signal is a further transducer converting said electrical driver signal to a mechanical drive output.

3. An apparatus to stabilize speed regulation of fluid driven rotating machinery comprising means sensing speed of said rotation and producing an output representative of said speed, a transducer means connected to receive said speed representing output and responsive thereto to produce a speed signal, a first differentiator connected to receive as an input said speed signal and responsive thereto to produce as an output an acceleration signal, a second differentiator connected to receive as an input said acceleration signal and responsive thereto to produce as an output a rate-of-change of acceleration signal, a signal summation device connected to receive as inputs said speed signal and a normal speed reference signal from a source thereof whereby said device responds to produce therein a signal representing speed deviation from a predetermined normal speed, said speed deviation signal having magnitude and direction determined in accordance with the magnitude and direction of the resultant summation of said inputs to said device, further connections supplying said signal summation device with inputs of both of said differentiator outputs and further speed control influencing signals from sources thereof, and said signal summation device being responsive thereto and to said speed deviation signal to produce as an output a driver signal having magnitude and direction determined in accordance with the magnitude and direction of the resultant summation of said inputs to said device, means receiving said driver signal for producing in response thereto a driver output having a magnitude and direction corresponding to said driver signal, means to determine the effective forces of the fluid drive rotating said machinery, and means operatively responsive to said driver output to control the magnitude and direction of the effect of said fluid drive force determining means.

4. The apparatus of claim 3 wherein said speed signal transducer produces a direct current output, said first and second differentiators comprise electrical means, said signal summation device comprises an electrical amplifier responsive to electrical signals from said differentiators, said speed signal transducer, and said further signal sources to produce an electrical driver signal, and said means responsive to said driver signal is an electromagnetic transducer converting said electrical driver signal to a mechanical output.

5. The apparatus of claim 3 additionally comprising a further transducer connected for operation by said means to determine the effective forces of the fluid drive rotating said machinery, and means connecting said further transducer to said signal summation device whereby said further transducer output corresponding to instant gate position is operative as a permanent droop factor in said summation of signals.

6. The apparatus of claim 3 wherein said means to determine the effective forces of the fluid drive rotating said machinery includes a fluid force controlling gate, and said apparatus additionally comprising a further transducer sensing the position of said gate and producing an electrical signal in response thereto, and a phase corrector receiving the gate position signal and providing an output signal representing the instant gate position, said signal summation device comprising a summer integrator producing an output signal representing a predetermined position for said gate, said means receiving said driver signal comprising a driver amplifier and a still further transducer, and said means to control the effect of said fluid drive force determining means comprising directionally operable gate displacing means, said instant gate position signal and said predetermined gate position signal being received in said driver amplifier whereby the magnitude and direction of said driver output is determined in accordance with the difference in said gate position signals, and said instant gate position signal is derived in a feedback relationship determined by the operation of said still further transducer in accordance with said driver output signal to control said gate displacing means, said further transducer in response to gate displacement, and said phase corrector in accordance with said gate position signal from said further transducer.

7. The apparatus of claim 6 further comprising an electrical connection from the output of said signal summation device supplying as an input thereto a predetermined portion of said output which is operative therein as a permanent droop factor signal.

References Cited

UNITED STATES PATENTS

| 3,187,223 | 6/1965 | Raeber | 317—5 |
| 3,288,160 | 11/1966 | Eggenberger | 137—25 X |
| 3,274,443 | 9/1966 | Eggenberger | 137—30 X |
| 3,291,146 | 12/1966 | Walker | 137—17 |
| 3,340,883 | 9/1967 | Peternel | 137—26 |
| 3,348,559 | 10/1967 | Brothman | 137—30 |

CLARENCE R. GORDON, Primary Examiner

U.S. Cl. X.R.

137—48, 30; 317—5